US009810973B2

(12) United States Patent
Elmohtaseb

(10) Patent No.: US 9,810,973 B2
(45) Date of Patent: Nov. 7, 2017

(54) OMNIDIRECTIONAL BRACKET FOR CAMERAS AND ACCESSORIES

(71) Applicant: Sage Elmohtaseb, Los Angeles, CA (US)

(72) Inventor: Sage Elmohtaseb, Los Angeles, CA (US)

(*) Notice: Subject to any disclaimer, the term of this patent is extended or adjusted under 35 U.S.C. 154(b) by 0 days.

(21) Appl. No.: 15/140,462

(22) Filed: Apr. 27, 2016

(65) Prior Publication Data

US 2016/0313630 A1    Oct. 27, 2016

Related U.S. Application Data

(60) Provisional application No. 62/153,286, filed on Apr. 27, 2015.

(51) Int. Cl.
| G03B 17/56 | (2006.01) |
| F16M 11/14 | (2006.01) |
| F16M 11/20 | (2006.01) |
| F16M 13/02 | (2006.01) |

(52) U.S. Cl.
CPC .......... *G03B 17/561* (2013.01); *F16M 11/14* (2013.01); *F16M 11/2078* (2013.01); *F16M 13/02* (2013.01); *G03B 17/566* (2013.01); *F16M 2200/022* (2013.01); *F16M 2200/068* (2013.01)

(58) Field of Classification Search
None
See application file for complete search history.

(56) References Cited

U.S. PATENT DOCUMENTS

2012/0268151 A1*  10/2012  Zai ..................... G01R 31/2887
                                                  324/750.16

* cited by examiner

*Primary Examiner* — Rochelle-Ann J Blackman
(74) *Attorney, Agent, or Firm* — Edwin Tarver

(57) ABSTRACT

A mechanical camera bracket for mounting different accessories to the camera is disclosed that ensures a positive lock through the central hub from which extend a first arm and a second arm, allowing for accessories to be attached and detached without having to remove the entire bracket. The central hub has a clamping knob and defining a common axis about which the first arm and second arm rotate. A first bushing and second bushing are rotatable about the common axis in tandem with the first arm and second arm. The first bushing and second bushing each have a first ramp coupled to a first pressure cup in a first ball head camera mount and a second pressure cup in a second ball head camera mount. The clamping knob is configured to move the ramps along the common axis, thus urging the pressure cups against the ball heads.

16 Claims, 3 Drawing Sheets

OMNIDIRECTIONAL BRACKET FOR CAMERAS AND ACCESSORIES

RELATED APPLICATIONS

This application claims priority to provisional U.S. Patent Application Ser. No. 62/153,286, entitled "A mechanical arm to attach to a camera for mounting different accessories to the camera," which was filed on Apr. 27, 2015.

BACKGROUND

Field of the Invention

The present invention generally relates to camera mounts. More specifically, the present invention relates to an omnidirectional bracket for mounting to and positioning cameras and camera accessories for improved efficiency when unlocking, repositioning, replacing and re-locking various accessories to the camera.

Related Art

Apparatus for stabilizing cameras are known in the art, from conventional tripods and monopods, to more recent technologies including clamp-pods, and camera mounts having articulating arms. Stabilization apparatus affix to cameras using head mounts. A popular head mount, due to its omnidirectional aiming ability, is the ball head mount, which uses a ball and socket type joint for orientation and control. A user typically sets up a tripod or similar stabilizer, affixes the ball head mount to a camera and attaches the mount to the tripod.

For motion picture and commercial filming, more advance stabilization apparatus may be used, including a ball head mount affixed to an armature that is fastened to another structure. For example, a ball head mount may be attached to a "super clamp" (a clamp capable of affixing to a variety of structures, either having a spring loaded jaw, or having a threaded closure for attachment). Also known are fixation systems where the camera mount is separated from a clamp by an arm or multiple articulating arms.

Apparatus currently known in the art have several drawbacks. First, connections between the arms separating the camera mount and clamp may degrade over time, allowing the camera arm to become stripped, and slip when engaged. In particular, center locking mechanisms often are insufficiently resilient to securely hold cameras and accessories. Second, locking mechanisms currently in the art have locked ends that require users to laboriously unscrew a mount attached to a camera or accessory for removal and replacement. And such apparatus often have free-standing parts (e.g., nuts, washers, etc.) that can be easily accidentally lost during replacement.

For these reasons there is a need for a camera and accessory positioning tool that allows virtually omnidirectional positioning of a camera relative to an accessory or stabilized object, that avoids slipping and stripping of the camera arm. There is also a need for a multi-arm camera stabilization system that provides a more sturdy and robust center locking mechanism with no free standing parts that can be accidentally lost through user error. There is also a need for a camera stabilization arm that adds quick release functionality thereby allowing easy attachment and removal of accessories. Additionally, there is a need for a camera stabilizer with an articulating arm that allows accessories to be attached and detached without having to remove the entire arm.

These and other objects of the present invention are more fully discussed in the following specification, illustrations and claims.

SUMMARY

An omnidirectional camera and accessory bracket for mounting and fixing a camera relative to a support includes a first arm having a first ball head camera mount. The first arm is coupled to a central hub having a clamping knob and defining a common axis about which the first arm rotates. The central hub also has a first bushing rotatable about the common axis in tandem with the first arm. The first bushing has a first ramp coupled to a first pressure cup under a first ball head in the first ball head camera mount. The clamping knob is configured to move the first ramp along the common axis, thus urging the first pressure cup against the first ball head.

The bracket also has a second arm having a second ball head camera mount, with the second arm also coupled to the central hub. A second bushing is rotatable about the common axis in tandem with the second arm. The second bushing comprises a second ramp coupled to a second pressure cup under a second ball head in the second ball head camera mount. The clamping knob is additionally configured to move the first ramp and the second ramp along the common axis, urging the first pressure cup against the first ball head and urging the second pressure cup against the second ball head, thereby affixing the camera and the support in a predetermined position.

Preferably the bracket also includes first teeth and second teeth in a facing arrangement, wherein the first teeth and the second teeth are configured to engage each other when the clamping knob is rotated. Also preferably, an upper force rod in the first arm biases the first pressure cup against the first ball head, and a rod lock is biased to lock the upper force rod against the first ball head. A lower force rod in the first arm is biased against the first bushing. In such a configuration, the clamping knob is configured to move the first bushing, driving the first ramp against a lower force rod, the lower force rod engaging an upper force rod that in turn urges the first pressure cup against the first ball head, locking it in position in the first ball head camera mount.

The apparatus may also by characterized as an omnidirectional camera and accessory bracket for mounting and fixing a camera relative to a support, the bracket having a central hub with a clamping knob, the central hub defining a common axis about which a first arm and a second arm rotate. The first arm has a first ball head camera mount and the second arm has a second ball head camera mount, with the central hub further including a first bushing coupled to the first arm and a second bushing coupled to the second arm, the first bushing having a first ramp and the second bushing having a second ramp.

The first ramp is coupled to a first pressure cup under a first ball head in the first ball head camera mount and the second ramp coupled to a second pressure cup under a second ball head in the second ball head camera mount, and the clamping knob is configured to urge the first pressure cup against the first ball head and the second pressure cup against the second ball head when the clamping knob is rotated, thus locking the first ball head and the second ball head in position and locking the first arm against the second arm.

Characterized thusly, the bracket includes first teeth and second teeth in a facing arrangement, wherein the first teeth and the second teeth are configured to engage each other when the clamping knob is rotated. The bracket also includes an upper force rod in the first arm biasing the first pressure cup against the first ball head, and a rod lock biased to lock the upper force rod against the first ball head. A lower force rod in the first arm is biased against the first bushing. The clamping knob is configured to move the first bushing, driving the first ramp against a lower force rod, the lower force rod engaging an upper force rod that urges the first pressure cup against the first ball head, locking it in position in the first ball head camera mount.

DETAILED DESCRIPTION

The following description is presented to enable any person skilled in the art to make and use the invention, and is provided n the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
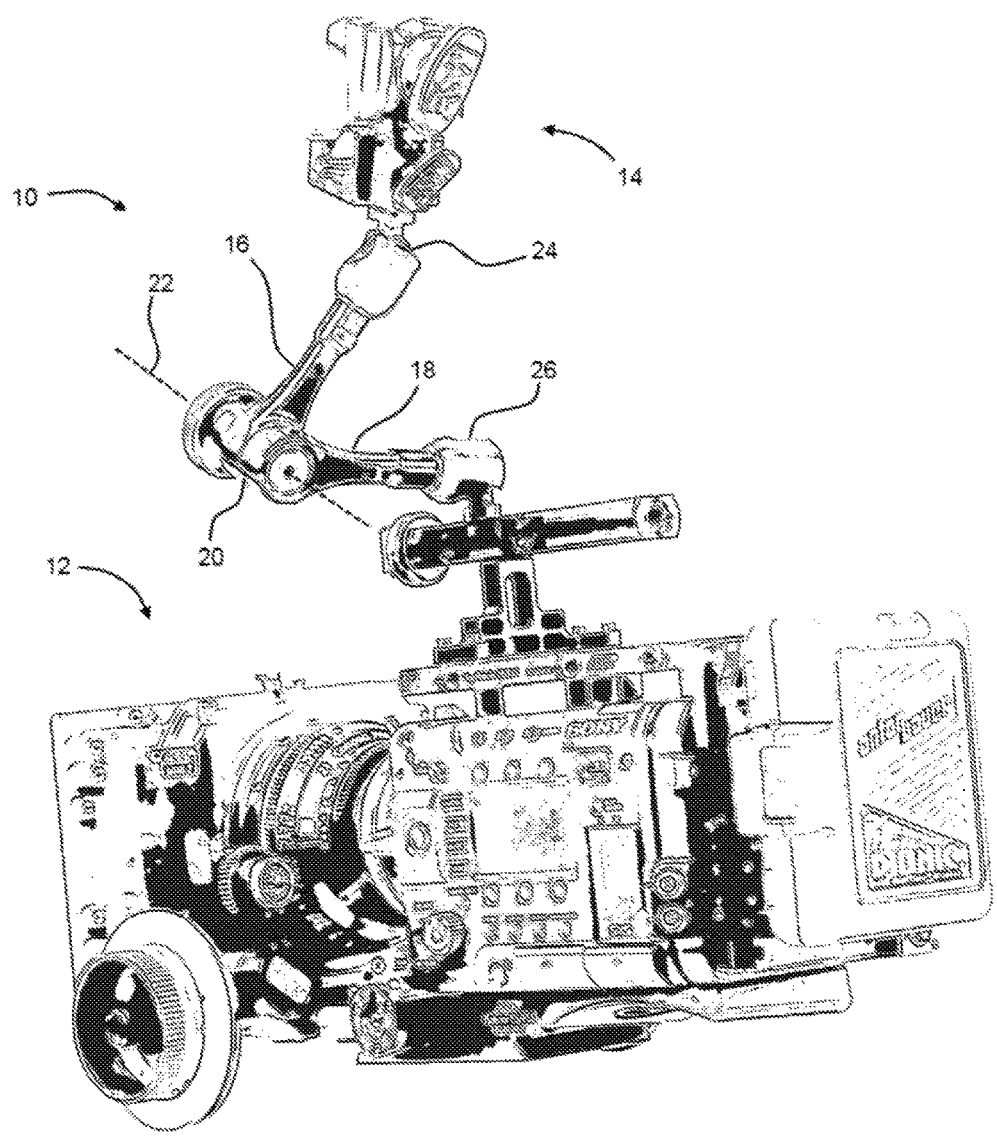
FIG. 1 illustrates a perspective view of an omnidirectional bracket for cameras affixed to a camera and a support.

Referring to FIG. 1, the bracket 10 is shown connecting a camera 12 to a support 14. In the illustrated embodiment, a rail mount style support 14 is shown. The bracket 10 comprises principally a first arm 16 and a substantially similar second arm 18, the first arm 16 and the second arm 18 joined at a hub 20. The hub 20 enables the first arm 16 and the second arm 18 to rotate relative to each other about a common axis 22. Opposite the hub 20, the first arm 16 has a first ball head camera mount 24 to which the support 14 is affixed in the illustrated example, and the second arm 18 has a substantially similar second ball head camera mount 26 to which the camera 12 is affixed. The central hub 20, first ball head camera mount 24 and second ball head camera mount 26 can be locked in place to fasten the camera 12 in a position relative to the support 14 and in virtually any position preferred by a user.

Figure 2:
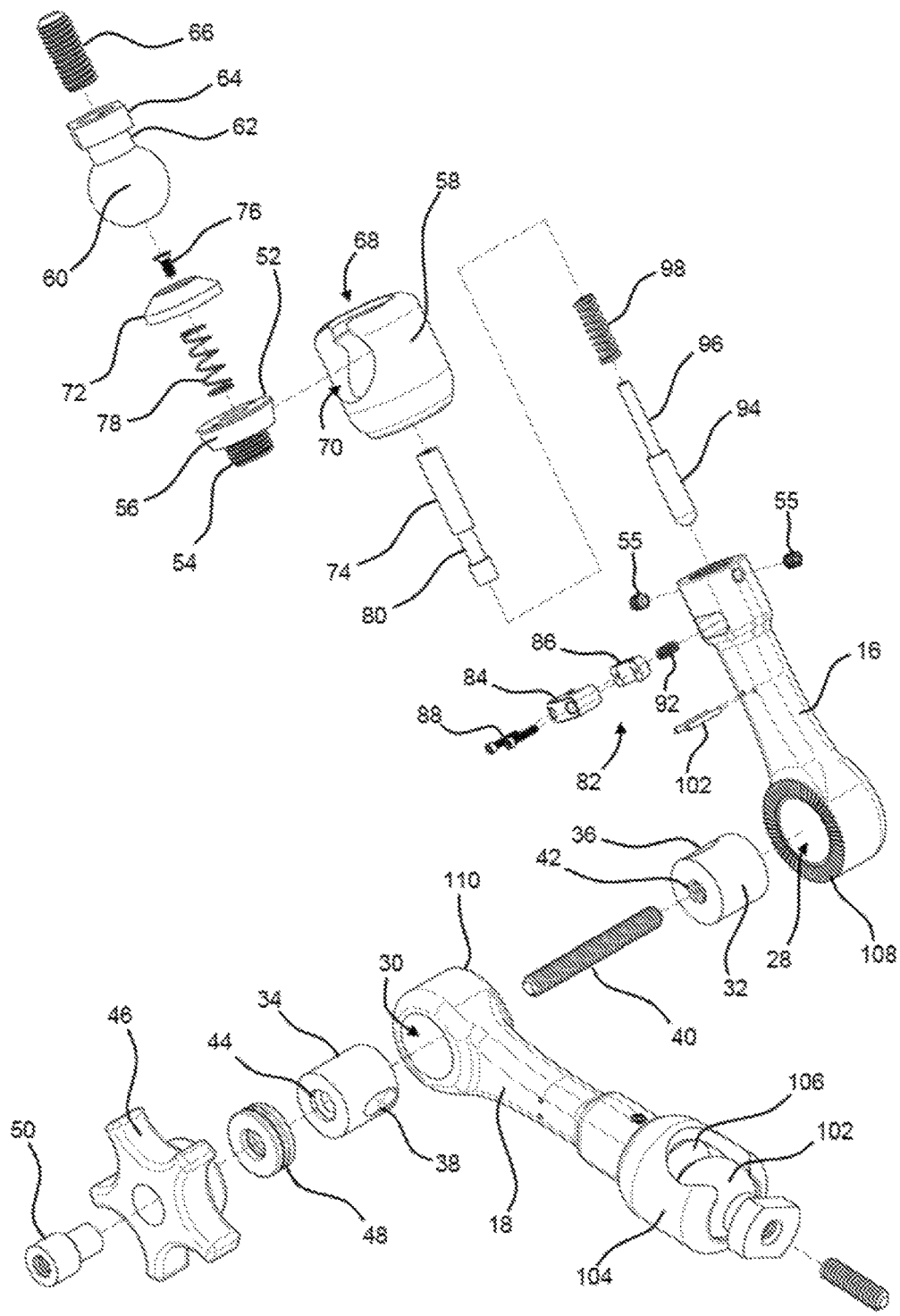
FIG. 2 illustrates an exploded view of the bracket.

Referring to FIG. 2, the first arm 16 has a first hub bore 28 and the second arm has a second hub bore 30. Making up the central hub 20 (FIG. 1), a first bushing 32 is seated in the first hub bore 28 and a second bushing 34 is seated in the second hub bore 30. The first bushing 32 comprises a first ramp 36 and the second bushing 34 comprises a second ramp 38. In the first arm 16, the first ramp 36 anchors a lower force rod 96 in a position holding the first bushing 32 in the first hub bore 28. The second ramp 38 in the second bushing 34 holds it in the second hub bore 30 in a similar manner. A threaded rod 40 engages a threaded bore 42 on the first bushing 32, thereby locking the threaded rod 40 to the first bushing 32. The second bushing 34 includes an unthreaded bore 44 through which the threaded rod 40 travels, allowing the second bushing 34 to rotate freely around the threaded rod 40. A clamping knob 46 having a thrust bearing 48 and a clamping nut 50 engage the threaded rod 40 for tightening and loosening the central hub 20.

Still referring to FIG. 2, the first ball head camera mount 24 (FIG. 1) includes a first taper lock 52 that engages the first arm 16. The first taper lock 52 has a threaded portion 54 for securely engaging the first arm 16 and a taper portion 56 for engaging a first socket head 58. The threaded portion 54 may be secured in the first arm 16 using set screws 55. A first ball head 60 includes a neck portion 62 terminating in a tapped mounting plate 64 and ball head set screw 66. The ball head set screw 66 is preferably a standard size complimentary to standard mounts (not shown) on the camera 12 and the support 14.

The first socket head 58 includes a primary opening 68 and a secondary opening 70. The primary opening 68 is preferably beveled to accommodate the curvature of the first ball head 60, and is sized to retain the first ball head 60 therein. While the primary opening 68 retains the first ball head 60 within the first socket head 58, it is large enough to allow the neck 62, tapped mounting plate 64 and ball head set screw 64 to move within its confines. The secondary opening 70 is sized to allow the first ball head 60 to pass out of the first socket head 58, thereby allowing the first ball head 60 (and any associated attached camera 12 or support 14) to be removed from the bracket 10.

Still referring to FIG. 2, the first ball head 60 is held against the primary opening 68 by a first pressure cup 72 that urges the first ball head 60 against the primary opening 68. The first pressure cup 72 is secured to an upper force rod 74 by a screw 76, and the upper force rod 74 extends through the first taper lock 52. The first pressure cup 72 and upper force rod 74 are biased to a raised position by an upper spring 78. The upper force rod 74 includes a notch 80 around its circumference corresponding in size to a rod lock 82 that locks the upper force rod 74 (and first pressure cup 72) in a raised position. The rod lock 82 preferably comprises an upper half 84 and a lower half 86 secured by hex screws 88. The upper half 84 and lower half 86 secure together around the upper force rod 74, allowing it to travel through the rod lock 82. The rod lock 82 is housed in the first arm 16 in a rod lock bore 90 and a compression spring 92 biases the rod lock 82, such that when it aligns with the notch 80, the rod lock 82 moves into the notch 80 locking the upper force rod 74 and the first pressure cup 72 in a raised position against the first ball head 60 preventing it from disengaging the first socket head 58.

Still referring to FIG. 2, a lower force rod 94 engages the upper force rod 74. The lower force rod 94 includes a narrow portion 96 for accommodating a lower spring 98 and a rounded terminal end 100. The lower spring 98 biases the terminal end 100 toward the first ramp 36 using pins 102 in the first arm 16. Having the lower force rod 94 resiliently engage the first bushing 32 preserves the first bushing 32 in the first hub bore 28, even when the clamping knob 46 is rotated to loosen the bracket 10. The second arm 18 and second ball head camera mount 26 (FIG. 1) preferably have substantially the same features (i.e., a second ball head 102, second socket head 104, second pressure cup 106, etc.) as the first arm 16. When the first arm 16 and second arm 18 are locked together, first teeth 108 on the first arm 16 engage second teeth 110 on the second arm 18, thereby locking the first arm 16 and the second arm 18 in position relative to each other around the common axis 22.

Figure 3:
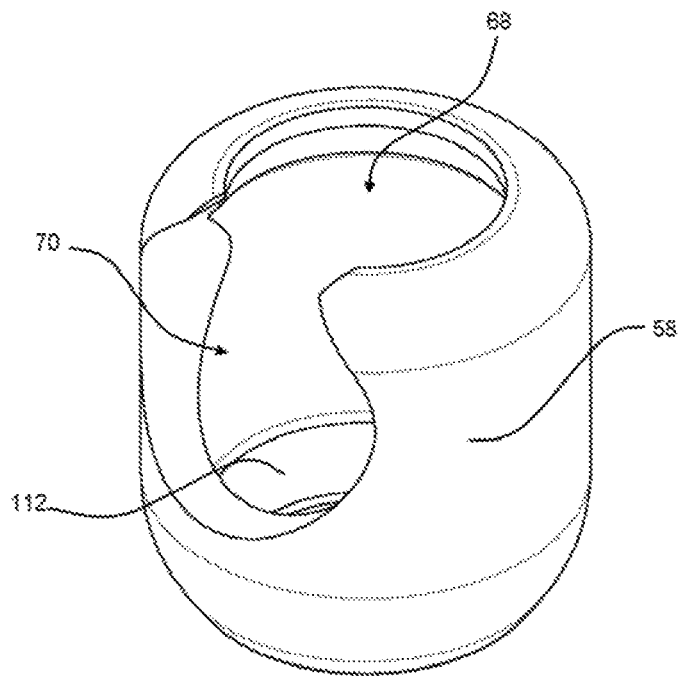
FIG. 3 illustrates a perspective view of a first socket head of the bracket.

Referring to FIG. 3, an isometric view of the first socket head 58 shows the primary opening 68 and the secondary opening 70, which are preferably conjoined such that the neck can move down into the secondary opening 70 when the first ball head 60 is pressed against the primary opening 68, thereby allowing additional movement of the camera 12 or support 14. When the clamping knob 46 is rotated to loosen the bracket 10, this arrangement also allows the first ball head 60 to slide sideways from the first socket head 58 without rotating the first ball head relative to the first socket head 58, making the first ball head 60 easier to remove from the first socket head 58. The first socket head 58 also includes a socket head taper 112, complimentary to the taper portion 56 of the first taper lock 52, which holds the first socket head 58 securely in position on the first arm 16 when the first ball head 60 is pressed against the primary opening 68 under pressure. The second socket head 104 preferably has substantially the same features as the first socket head 58.

Figure 4:
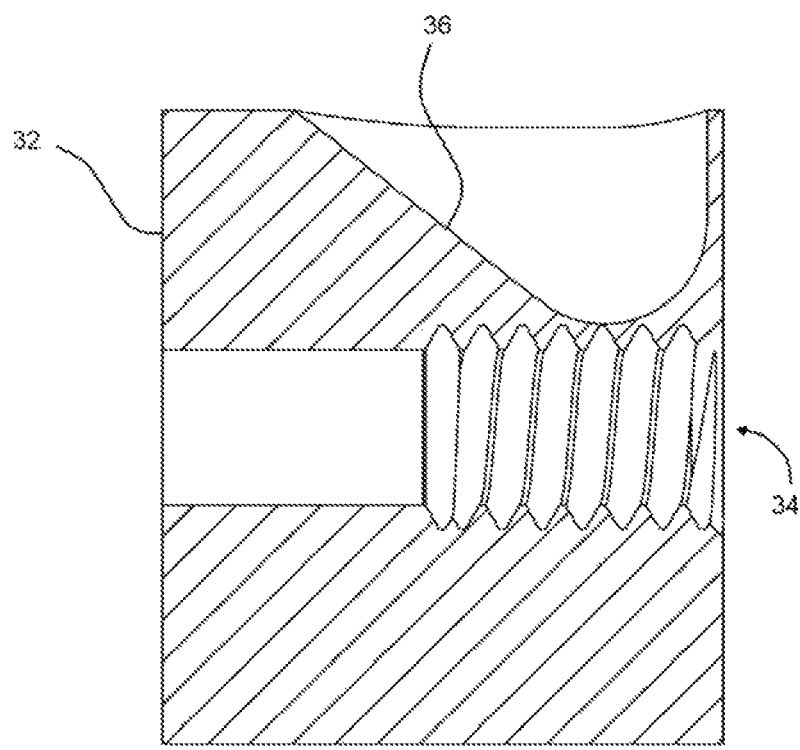
FIG. 4 illustrates a section view of a first bushing of the bracket.

Referring to FIG. 4, a cut-away view of the first bushing 32 is shown. In this view the threaded bore 42 is shown extending through the first bushing 32, and the first ramp 36 extending inward at an angle. When the threaded rod 40 is locked in the threaded bore 42 and the clamping knob 46 rotated, the first bushing 32 is urged laterally through the first hub bore 28. The first ramp 36 is preferably angled such that when the first bushing 32 moves laterally, the first ramp 36 urges the terminal end 100 upward without binding the lower force rod 94 in the first arm 16. The second bushing 34 preferably has substantially the same structure, except that it has an unthreaded bore 44.

In order to promote resilient yet smooth operation of the bracket, a heavy duty grade thread locking compound (not shown) is preferably used on the screw 76 to lock it securely in the upper force rod 74, also on the ball head set screw 66 to lock it in the tapped mounting plate 64, on the threaded rod 40 to lock it in the threaded bore 42, and on the clamping nut to lock it inside the clamping knob 46. A medium grade thread locking compound (not shown) is preferably used on the hex screws 88 and set screws 55 since these may occasionally require disassembly. For proper lubrication, a grease (not shown) appropriate for metal parts, for example a molybdenum disulfide-based grease may be applied to the taper portion 56, the upper force rod 74 adjacent the notch 80, the lower force rod 94 including on the narrow portion, the compression spring 92 and lower half 86 of the rod lock 82, the threaded rod 40, thrust bearing 48, and on the first ramp 36 and second ramp 38 of the first bushing 32 and second bushing 34, respectively.

The structure and components of the bracket 10 having been shown and described, its method of operation will now be discussed.

The bracket 10 may be initially encountered in a fully closed position. To install the camera 12 and support 14 thereon, a user rotates the clamping knob 46 in a loosening direction. As the clamping knob 46 rotates, the clamping nut 50 rotates with it, driving the clamping nut 50 along the threaded rod 40. The thrust bearing 48 reduces friction and impingement of the clamping knob 46 as it rotates relative to the second bushing 34. As the clamping nut 50 rotates toward disengaging the threaded rod 40, the first bushing 32 and the second bushing 34 are able to separate, driven apart by pressure from the lower force rod 94 against the first ramp 36 of the first bushing 32. A similar action occurs on the second bushing 34 and second ramp 38.

Although the lower force rod 94 moves when the bracket 10 is loosened, the upper force rod 74 is locked in place by the rod lock 82, thereby maintaining the first pressure cup 72 in a raised position against the first ball head 60. As the first bushing 36 moves laterally in the first hub bore 28, the terminal end 100 moves down the first ramp 36, allowing the lower force rod 94 to move inside the first arm 16 toward the central hub 20, driven in that direction by the lower spring 98. As the lower force rod 94 moves toward the central hub 20, room is created for the upper force rod 74 to move down as well. Although the rod lock 82 initially holds the upper force rod 74 in position, by pressing on the upper half 84, a user can urge the rod lock 82 into the rod lock bore 90, overcoming the action of the compression spring 92. By pressing the rod lock 82 into the rod lock bore 90, the rod lock 82 clears the notch 80 on the upper force rod 74, and the upper force rod 74 is able to move downward.

In the first ball head camera mount 24, the upper spring 78 biases the upper force rod 74 and first pressure cup 72 in a raised position, even with the rod lock 82 not engaged, so a user must press in the rod lock 82 to disengages the upper force rod 74, and at the same time, use downward pressure on the first ball head 60 to drive the first pressure cup 72 and upper force rod 74 downward. To aid in this process, the first socket head 58 may be urged downward by the user as well. With the first pressure cup 72 able to move up and down, and pressing the first ball head 60 downward (optionally with the aid of the first socket head 58), the first ball head 60 is brought into a position clearing the secondary opening 70 and thus the user can remove the first ball head 60 from the bracket 10. The second ball head 102 may be removed from the second ball head camera mount 26 using a substantially similar action.

With the first ball head 60 and second ball head 102 removed, they may be attached to a camera 12 and a support 14 according to preference, in the case of the first ball head 60, by screwing the ball head set screw 66 into the camera 12 or support 14 until it reaches the tapped mounting plate 64. A similar action affixes the second ball head 102 to the camera 12 or support 14. With the first ball head 60 affixed to a camera 12 or support 14, the first ball head 60 can be inserted back into the first socket head 58 by depressing the rod lock 82 and pushing the first ball head 60 through the secondary opening 70 until it seats on the first pressure cup 72. The spring action of the upper force rod 74 will raise it, and the rod lock 82, when released, will hold the upper force rod 74 in a locked position. Substantially the same action may be taken with regard to the second ball head camera mount 26 with similar results.

With the camera 12 and support 14 mounted on the bracket 10, the clamping knob 46 is rotated to tighten the clamping nut 50 on the threaded rod 40. As the clamping nut 50 travels along the threaded rod 40, it urges the first bushing 32 and the second bushing 34 together. The terminal end 100 is driven up the first ramp 36, and a similar action occurs on the second ramp 38. As the terminal end 100 travels up the ramp, the lower force rod 94 is driven upward, and engages the upper force rod 74. As this occurs the camera 12 and support 14 are still loose enough to be resiliently set to a preferred position. Also as this occurs, the first teeth 108 approach the second teeth 110. The first arm 16 ideally should be positioned relative to the second arm 18 before the first teeth 108 and second teeth 110 full engage each other. Ultimately the clamping knob is fully tightened, which secures the first teeth 108 and second teeth 110 together, and causes the lower force rod 94 and upper force rod 74 to drive the first pressure cup 72 forcefully against the first ball head 60, locking it against the first socket head 58. The first socket head is prevented from moving away from the first arm 16 due to the upper socket head taper 112 engaging the taper portion 56 of the first taper lock 52. In a fully tightened position, the bracket 10 resiliently holds the camera 12 in position relative to the support 14.

Frequently, a user will wish to change the position of the camera 12 relative to the support 14 without disengaging them from the bracket 10. This can be easily done by simply partially loosening the clamping knob 46 and clamping nut 50. As the clamping knob 46 is rotated, the clamping nut 50 moves along the threaded rod 40, allowing the first bushing 32 and second bushing 34 to separate. The terminal end 100 moves along the first ramp 36, allowing the lower force rod 94 and the upper force rod 74 to reduce pressure on the first ball head 60. The first ball head 60 can then be rotated in the first socket head 58, but cannot escape the first socket head due to the rod lock 82 engaging the notch 80 on the upper force rod 74. In the loosened position, the first teeth 108 and second teeth 110 are also preferably separated at least sufficiently for the first arm 16 to be rotated relative to the second arm 18. Once the camera 12 and support 14 are in the preferred new position, the clamping knob 46 is tightened once again, bringing the first teeth 108 and second teeth 110 together, and forcing the first pressure cup 72 against the first ball head 60 (and a similar action on the second ball head 102) to lock the camera 12 and support 14 in the new position.

Once a user is finished with the bracket 10 the clamping knob 46 can be loosened, the first ball head 60 and second ball head 102 removed, the camera 12 and support 14 disengaged therefrom, and the first ball head 60 and second ball head 102 reinserted into the bracket 10, the first arm 16 and second arm 18 preferably rotated to adjoin each other to save space, and the bracket 10 stored for future use.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An omnidirectional camera and accessory bracket for mounting and fixing a camera relative to a support, the bracket comprising:
   a first arm having a first ball head camera mount, the first arm coupled to a central hub having a clamping knob;
   a second arm having a second ball head camera mount, the second arm coupled to the central hub;
   the central hub defining a common axis about which the first arm rotates;
   the central hub comprising a first bushing rotatable about the common axis in tandem with the first arm;
   the first bushing having a first ramp coupled to a first pressure cup under a first ball head in the first ball head camera mount; and
   first teeth and second teeth in a facing arrangement, wherein the first teeth and the second teeth are configured to engage each other when the clamping knob is rotated, wherein the clamping knob is configured to move the first ramp along the common axis, urging the first pressure cup against the first ball head.

2. The bracket of claim 1 further comprising a second bushing rotatable about the common axis in tandem with the second arm.

3. The bracket of claim 2 wherein the second bushing comprises a second ramp coupled to a second pressure cup under a second ball head in the second ball head camera mount.

4. The bracket of claim 3, wherein the clamping knob is configured to move the first ramp and the second rump along the common axis, urging the first pressure cup against the first ball head and urging the second pressure cup against the second ball head, thereby affixing the camera and the support in a predetermined position.

5. The bracket of claim 1 further comprising an upper force rod in the first arm, the upper force rod biasing the first pressure cup against the first ball head.

6. The bracket of claim 5 further comprising a rod lock biased to lock the upper force rod against the first ball head.

7. The bracket of claim 1 further comprising a lower force rod in the first arm, the lower force rod biased against the first bushing.

8. The bracket of claim 1 wherein the clamping knob is configured to move the first bushing, driving the first ramp against a lower force rod, the lower force rod engaging an upper force rod that urges the first pressure cup against the first ball head, locking it in position in the first ball head camera mount.

9. An omnidirectional camera and accessory bracket for mounting and fixing a camera relative to a support, the bracket comprising:
   a central hub having a clamping knob, the central hub defining a common axis about which a first arm and a second arm rotate;
   the first arm having a first ball head camera mount and the second arm having a second ball head camera mount;
   the central hub further comprising a first bushing coupled to the first arm and a second bushing coupled to the second arm, the first bushing having a first ramp and the second bushing having a second ramp; and
   first teeth and second teeth in a facing arrangement, wherein the first teeth and the second teeth are configured to engage each other when the clamping knob is rotated; and
   the first ramp coupled to a first pressure cup under a first ball head in the first ball head camera mount and the second ramp coupled to a second pressure cup under a second ball head in the second ball head camera mount, wherein the clamping knob is configured to urge the first pressure cup against the first ball head and the second pressure cup against the second ball head when the clamping knob is rotated, locking the first ball head and the second ball head in position and locking the first arm against the second arm.

10. The bracket of claim 9 further comprising an upper force rod in the first arm biasing the first pressure cup against the first ball head.

11. The bracket of claim 10 further comprising a rod lock biased to lock the upper force rod against the first ball head.

12. The bracket of claim 9 further comprising a lower force rod in the first arm biased against the first bushing.

13. The bracket of claim 9 wherein the clamping knob is configured to move the first bushing, driving the first ramp against a lower force rod, the lower force rod engaging an upper force rod that urges the first pressure cup against the first ball head, locking it in position in the first ball head camera mount.

14. An omnidirectional camera and accessory bracket for mounting and fixing a camera relative to a support, the bracket comprising:
   a first arm having a first ball head camera mount, the first arm coupled to a central hub having a clamping knob;
   a second arm having a second ball head camera mount, the second arm coupled to the central hub;

the central hub defining a common axis about which the first arm and the second arm rotate;

the central hub comprising a first bushing rotatable about the common axis in tandem with the first arm and a second bushing rotatable about the common axis in tandem with the second arm;

the first bushing having a first ramp coupled to a first pressure cup under a first ball head in the first ball head camera mount and the second bushing comprising a second ramp coupled to a second pressure cup under a second ball head in the second ball head camera mount; and first teeth adjacent the central hub and the second arm comprises second teeth adjacent the hub, the first teeth and the second teeth in a facing arrangement, wherein the clamping knob is configured to move the first ramp and the second ramp along the common axis, urging the first pressure cup against the first ball head, and urging the second pressure cup against the second ball head.

15. The bracket of claim 14 further comprising an upper force rod in the first arm biasing the first pressure cup against the first ball head.

16. The bracket of claim 15 further comprising a rod lock biased to lock the upper force rod against the first ball head.

\* \* \* \* \*